United States Patent  [15] 3,706,432
Accashian  [45] Dec. 19, 1972

[54] REDUNDANT STABILIZER SUPPORT

[72] Inventor: John Accashian, Newtown, Conn.

[73] Assignee: United Aircraft Corporation, East Hartford, Conn.

[22] Filed: Sept. 14, 1971

[21] Appl. No.: 180,295

[52] U.S. Cl. ............................................244/83 R
[51] Int. Cl. ...........................................B64c 13/04
[58] Field of Search .....244/83 R, 83 B, 83 C, 82, 87, 244/89, 90, 39, 48, 17.11, 17.13, 17.15, 17.21, 17.23, 17.25; 64/1 S, 1 R, 1 C, 3, 4, 5

[56] References Cited

UNITED STATES PATENTS

| 2,437,330 | 3/1948 | Mullgardt | 244/90 R |
|---|---|---|---|
| 2,959,373 | 11/1960 | Zuck | 244/17.21 |

Primary Examiner—Trygve M. Blix
Assistant Examiner—Jesus D. Sotelo
Attorney—Vernon F. Hauschild et al.

[57] ABSTRACT

A horizontal stabilizer for a helicopter has two airfoil sections, one on each side of a tail cone. A stabilizer joining and torque tube mechanism comprising two concentric tubes mounted on bearings in the tail cone extends through the tail cone and beyond into the airfoil sections wherein the tubes terminate at laterally spaced points, the inner tube being longer than the outer tube. To transmit torque from the shafts to the airfoil sections a torque tube housing is provided in each airfoil section which conforms externally to and is connected to its airfoil section and which receives the end portions of both tubes and is bolted to them. An actuating lever for the stabilizer is provided on the torque tube mechanism within the tail cone which is connected to pilot controlled linkage.

7 Claims, 6 Drawing Figures

INVENTOR.
JOHN ACCASHIAN
BY
M. B. Jasker
ATTORNEY

INVENTOR.
JOHN ACCASHIAN
BY M.B. Jasker
ATTORNEY

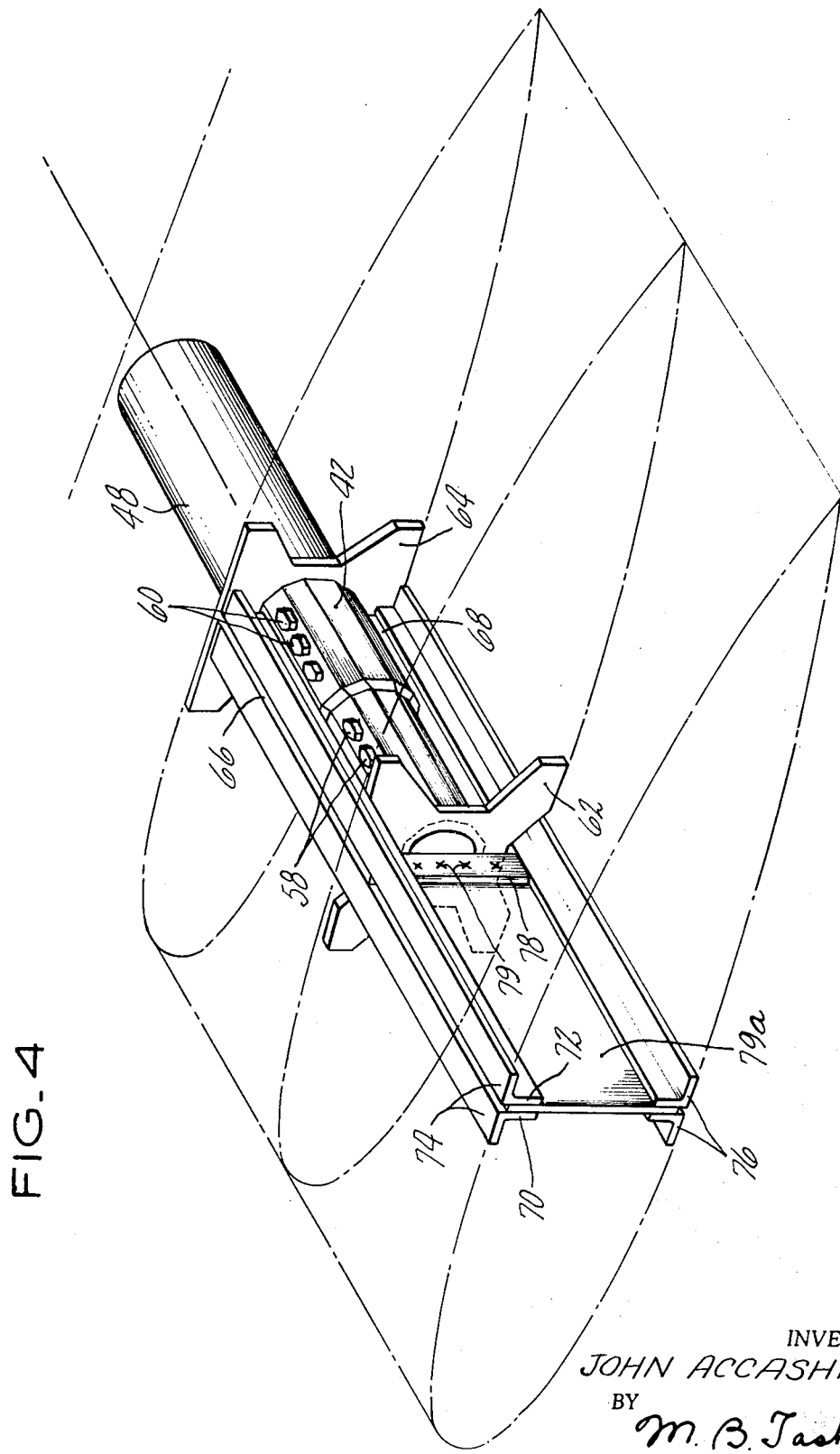

3,706,432

REDUNDANT STABILIZER SUPPORT

BACKGROUND OF THE INVENTION

1. Field of the Invention

This invention relates to horizontal stabilizers for aircraft, and particularly to an improved stabilizer joining and torque tube mechanism for horizontal stabilizers which comprise two airfoil sections divided by a tail cone.

2. Description of the Prior Art

Prior to this invention the stabilizer joining and torque tube mechanism has consisted of a single shaft or tubular member.

SUMMARY OF THE INVENTION

It is an object of this invention to provide a stabilizer joining and torque tube mechanism which includes two concentric tubular members that extend through and beyond the tail cone and into the airfoil sections on opposite sides of the tail cone.

It is a further object of this invention to provide such a stabilizer and torque tube mechanism which includes two concentric tubes which terminate in the airfoil sections at laterally spaced points, the inner tube being longer than the outer tube.

A further object of this invention is to provide an improved torque tube housing for the outboard portions of the concentric tubes within the airfoil sections for connecting the torque tube mechanism to the airfoil sections.

A still further object of this invention is generally to improve the performance and safety of horizontal stabilizers for aircraft.

BRIEF DESCRIPTION OF THE DRAWINGS

FIG. 4 is a detail in perspective showing the adapter fitting for one airfoil section of the stabilizer by which torque is transmitted from the concentric torque tubes to the airfoil section;

DESCRIPTION OF THE PREFERRED EMBODIMENT

Figure 1:
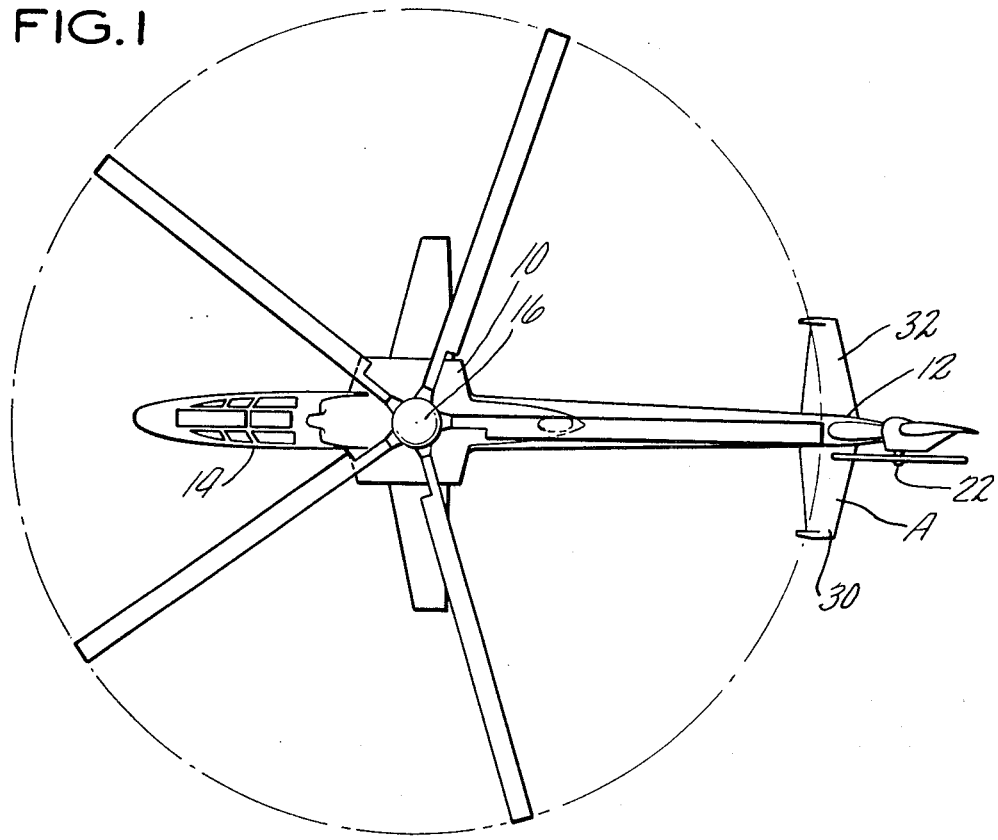
FIG. 1 is a plan view of a helicopter having a horizontal stabilizer equipped with the improvements of this invention.
Figure 2:
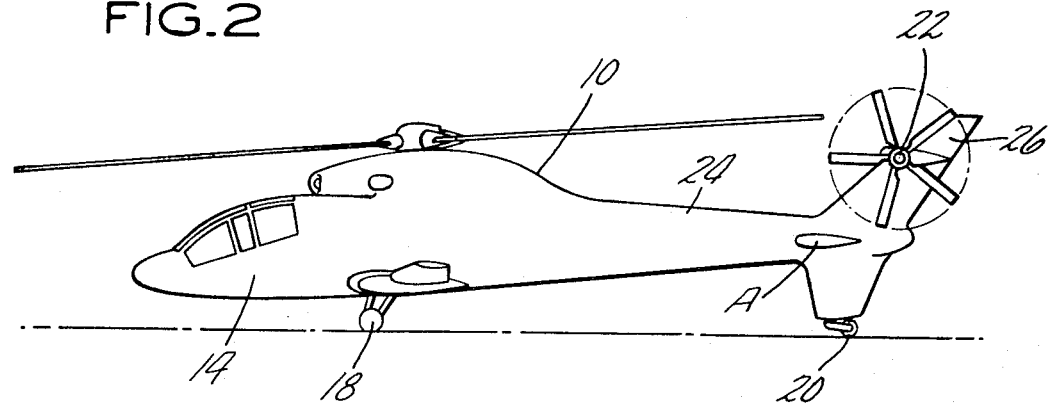
FIG. 2 is a side view of the helicopter of FIG. 1.

Referring to FIGS. 1 and 2, the helicopter illustrated includes a fuselage 10 and an empennage 12, a pilot compartment 14, a 5-bladed rotor 16 and usual forward and aft landing gear 18 and 20. A tail rotor 22 is provided at the aft end of tail cone 24 at one side of a vertical stabilizer 26.

Figure 3:
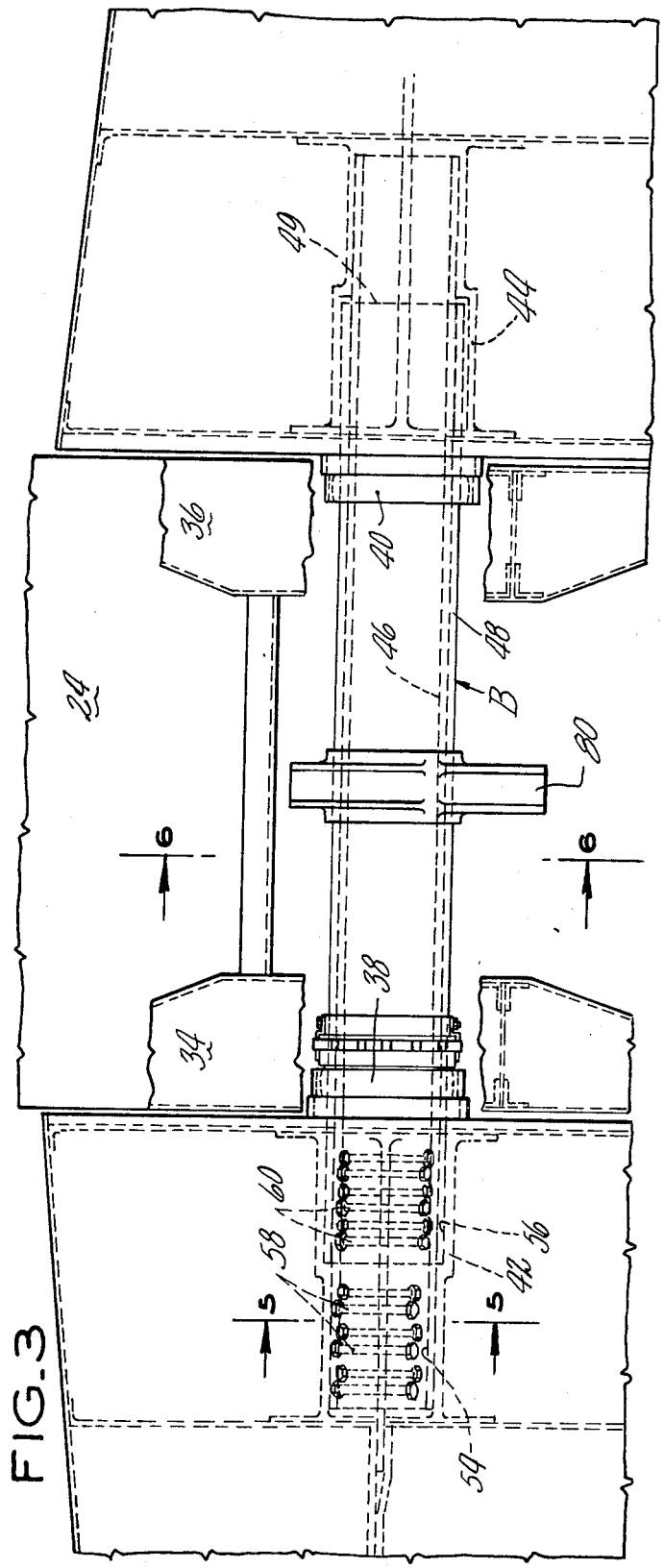
FIG. 3 is a view of the tail cone with parts broken away showing the improved airfoil joining and torque tube mechanism in plan view.

A horizontal stabilizer, generally indicated as A, with which the invention is particularly concerned, is located just forward of the tail rotor and includes two separate airfoil sections 30 and 32 located on the port and starboard sides, respectively, of the helicopter and separated by the tail cone. Airfoil sections 30, 32 are mounted in the tail cone on a torque tube assembly for limited movement about the generally horizontal axis of the assembly. This assembly is best shown in FIG. 3.

Tail cone 24 is shown to have left and right-hand longitudinal frame members 34 and 36, parts of which are broken away in the vicinity of the torque tube assembly generally indicated as B. The assembly is mounted in the tail cone frame members on two anti-friction bearings 38, 40 and extends outboard of the tail cone where it is provided with special fittings 42 and 44 which constitute transition members to carry torque exerted on the assembly to the airfoil sections 30, 32.

Figure 5:
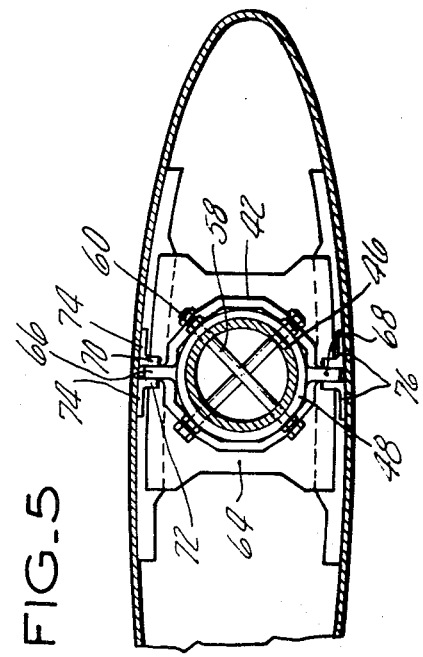
FIG. 5 is a section taken on line 5—5 of FIG. 3.

In accordance with this invention the assembly B is made up of two concentric inner and outer stainless steel tubes 46 and 48 of which the inner tube is the longer so that it extends at both ends beyond the outboard end 49 of the outer tube 48. Both tubes extend outboard of the tail cone a substantial distance and carry on their extended end portions the above mentioned fittings 42, 44. These fittings are basically octagonal on their external surfaces and have circular sockets 54, 56 of different diameter to receive the circular outboard end portions of shafts 46, 48 with a snug fit. A series of bolts 58, herein six in number, extend through fitting 42 and inner shaft 46, as shown in FIGS. 3 and 5 and a series of slightly longer bolts 60 extend through fitting 42 and shafts 46, 48, as shown in FIG. 3, these bolts being distributed about the hexagonal periphery of the fitting as are bolts 58. It will be understood that fitting 44 is similarly bolted to shafts 46, 48 although these bolts have not been shown.

Shafts 46, 48 have a slight clearance between bearing 38 and bearing 40 but preferably have no clearance between them throughout their outboard portions.

Fittings 42, 44 are identical. One, the left-hand fitting 42, is shown in FIG. 4 in perspective. It will be noted that in addition to the two-diameter socket portion described above into which the tubes 46, 48 are snugly fitted and to which they are bolted, the fitting has transverse plates 62, 64 at its ends formed integral therewith. The fitting is preferably a forging. These plates are shaped at top and bottom to fit the airfoil contour of the stabilizer section but are preferably not in contact therewith and have top and bottom integral flanges 66, 68 which are received between and secured to parallel spaced spanwise flanges 70, 72 of pairs of angle irons 74, 76 on the inside surface of the airfoil sections. Transverse plate 62 has top and bottom portions cut away to receive angle irons 74, 76 and a vertical web 78 connects flanges 66, 68. This flange 78 is connected, as by rivets 79, to an offset end portion of web 79a which, with angle irons 74, 76 and fitting 42, forms the spar of the airfoil section 30.

The inner and outer races of anti-friction bearings 38, 40 are suitably fitted to shaft 48 and to frame members of the tail cone to which the outer race is locked by a locking mechanism 62, one of which is shown in association with bearing 38.

Figure 6:
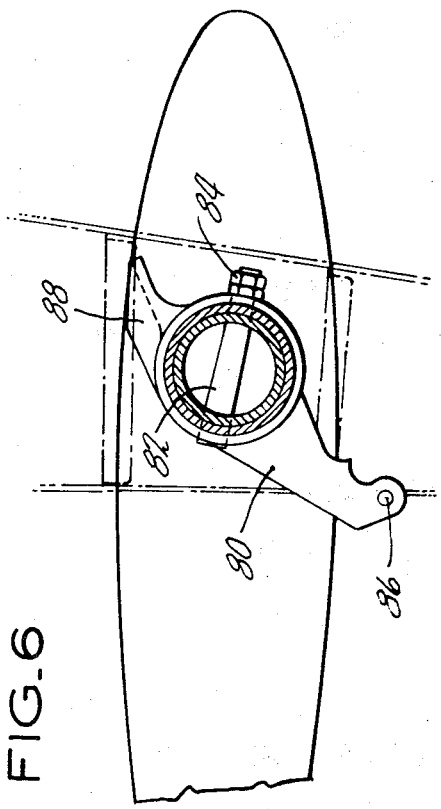
FIG. 6 is a section taken on line 6—6 of FIG. 3 showing the actuating lever for the torque tube mechanism in end view.

Torque is applied to the assembly B by the pilot through conventional control linkage or by a servo motor which is connected to a torque arm 80 (FIG. 6) secured to the shafts by a tapered pin 82 and nut 84. The pilot's control mechanism is connected to lever 80 at one end at 86. The other end 88 of arm 80 cooperates with suitable stops to limit the oscillation of the assembly to approximately 20° above and 20° below a neutral horizontal position.

As a result of the construction above described, a redundant support is provided for the airfoil sections of stabilizer A which, if a crack should develop in one of the tubes 46, 48, will insure the safe operation of the helicopter until the next periodic inspection of the stabilizer.

Further, due to the improved construction of the torque tube housing and its attachment, both to the concentric tubes and to the airfoil sections, the development of stress cracks in the tubes is greatly minimized and long and satisfactory operation of the assembly is assured.

I wish it to be understood that I do not desire to be limited to the exact details of construction shown and described, for obvious modifications will occur to a person skilled in the art.

I claim:

1. In an aircraft having a horizontal stabilizer comprising two airfoil sections on opposite sides of a tail cone, a stabilizer joining and torque tube assembly including inner and outer concentric tubes journalled in the tail cone and extending outboard therefrom into the airfoil sections, means for operatively connecting said tubes to the airfoil sections, and stabilizer actuating means carried by said tubes within the tail cone.

2. In an aircraft having a horizontal stabilizer comprising two airfoil sections on opposite sides of a tail cone, a redundant stabilizer support including inner and outer tubes journalled on aircraft structure within the tail cone and extending outboard therefrom into the airfoil sections, torque transmission means within said airfoil sections fixed to the outboard ends of said tubes and to said respective airfoil sections, and actuating means for said stabilizer fixed to said tubes within said tail cone.

3. The combination of claim 2 in which the inner tube is longer than and extends beyond both ends of the outer tube and the torque transmission means consists of a fitting in each airfoil section having sockets in which the ends of the tubes are snugly received and which has transverse members shaped to conform to the airfoil sections.

4. The combination of claim 3 in which fasteners are extended through the fittings and the tubes and flanges are provided on the fittings connecting the transverse members which are attached to spanwise frame members of the airfoil sections.

5. A redundant support for the horizontal stabilizer of an aircraft comprising a torque tube assembly journalled in the aircraft fuselage and extending outboard thereof into airfoil sections of the stabilizer, said assembly including inner and outer tubes, torque transmitting fittings having sockets into which the ends of said tubes are snugly received, means for securing said fittings to said tube ends, transverse flange members on said fittings at points spaced spanwise of said stabilizer which conform to the airfoil sections thereof, means for connecting said fittings to said airfoil sections, and actuating means on said assembly within said fuselage having an operative connection to pilot operated mechanism.

6. The combination of claim 5 in which the inner tube extends beyond the outboard ends of the outer tube and the torque transmitting fittings are connected to the airfoil sections by locking flanges extending lengthwise of said fittings between said transverse flange members thereon and which are secured to spanwise frame members on said airfoil sections.

7. The combination of claim 5 in which the torque transmitting fitting is a generally tubular member into which the tube ends extend and has an outer surface polygonal in cross section providing diametrically opposed faces, and the means for securing the inner and outer tubes to the fittings comprises bolts extended through the opposed faces on said fitting and through the tubes.

* * * * *